United States Patent [19]

Schumacher et al.

[11] Patent Number: 5,714,711
[45] Date of Patent: Feb. 3, 1998

[54] ENCAPSULATED PROPELLANT GRAIN COMPOSITION, METHOD OF PREPARATION, ARTICLE FABRICATED THEREFROM AND METHOD OF FABRICATION

[75] Inventors: John B. Schumacher, Huron; John P. Kosky, Sioux Falls, both of S. Dak.

[73] Assignee: MEI Corporation, Clearwater, Fla.

[21] Appl. No.: 636,439

[22] Filed: Dec. 31, 1990

[51] Int. Cl.$^6$ .............................. C06D 5/06; C06B 45/30
[52] U.S. Cl. .............................. 102/291; 102/289; 149/2; 149/5
[58] Field of Search .............. 149/2, 5–7; 102/288–291

[56] References Cited

U.S. PATENT DOCUMENTS

| | | | |
|---|---|---|---|
| 3,441,518 | 4/1969 | Stogryn et al. | 260/2 |
| 3,616,759 | 11/1971 | Meyr | 102/100 |
| 3,677,010 | 7/1972 | Fink et al. | 60/220 |
| 3,704,184 | 11/1972 | Kuehl et al. | 149/1 |
| 3,728,172 | 4/1973 | Dillehay et al. | 149/19 |
| 3,928,230 | 12/1975 | Unsworth et al. | 252/316 |
| 3,977,922 | 8/1976 | Inoue et al. | 149/2 |
| 3,995,559 | 12/1976 | Bice et al. | 102/100 |
| 4,013,743 | 3/1977 | Blasche et al. | 102/102 |
| 4,100,000 | 7/1978 | Sterling et al. | 149/2 |
| 4,180,535 | 12/1979 | Rhoades et al. | 102/103 X |
| 4,207,126 | 6/1980 | Ekman | 149/2 X |
| 4,414,044 | 11/1983 | Takeuchi et al. | 149/2 |
| 4,532,851 | 8/1985 | Reinelt et al. | 149/2 |
| 4,744,299 | 5/1988 | Sayles | 102/290 |
| 4,785,048 | 11/1988 | Chao | 524/475 |
| 4,814,274 | 3/1989 | Shioya et al. | 435/174 |
| 4,861,627 | 8/1989 | Mathiowitz et al. | 427/213.31 |
| 5,042,385 | 8/1991 | Reed, Jr. et al. | 102/290 |

*Primary Examiner*—Peter A. Nelson
*Attorney, Agent, or Firm*—Shlesinger Arkwright & Garvey

[57] ABSTRACT

A propellant grain composition for use in solid fuel rocket engines comprises a first reactant component consisting of an oxidizer. A polymeric barrier coating encapsulates the first reactant component and a second reactant component comprising a reducer fuel reactable with the oxidizer is coated thereon. A final polymeric coating is placed over the entire propellant grain to yield a unitary metal fuel-oxidizer propellant grain structure for use as a solid rocket fuel.

16 Claims, 1 Drawing Sheet

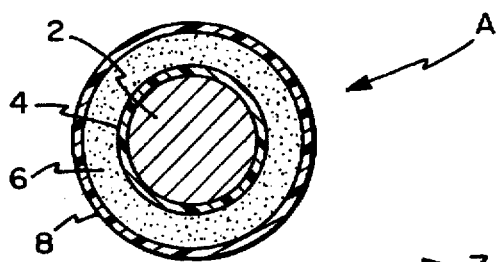
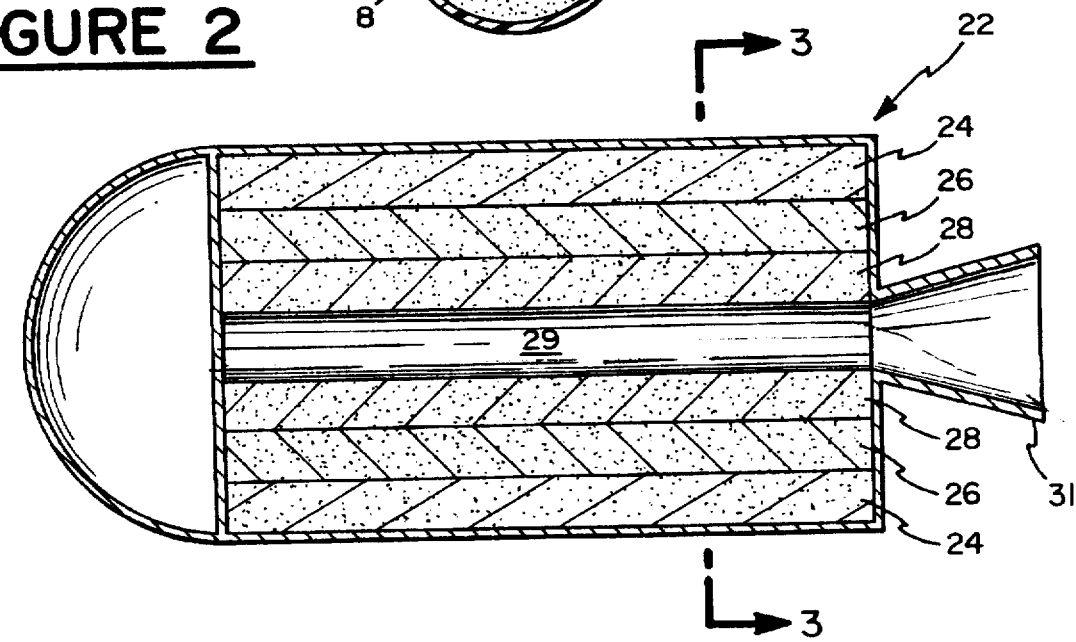
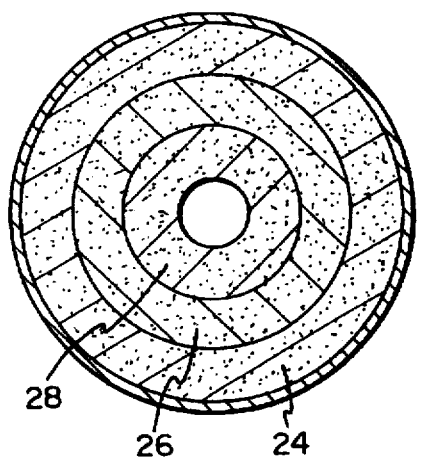
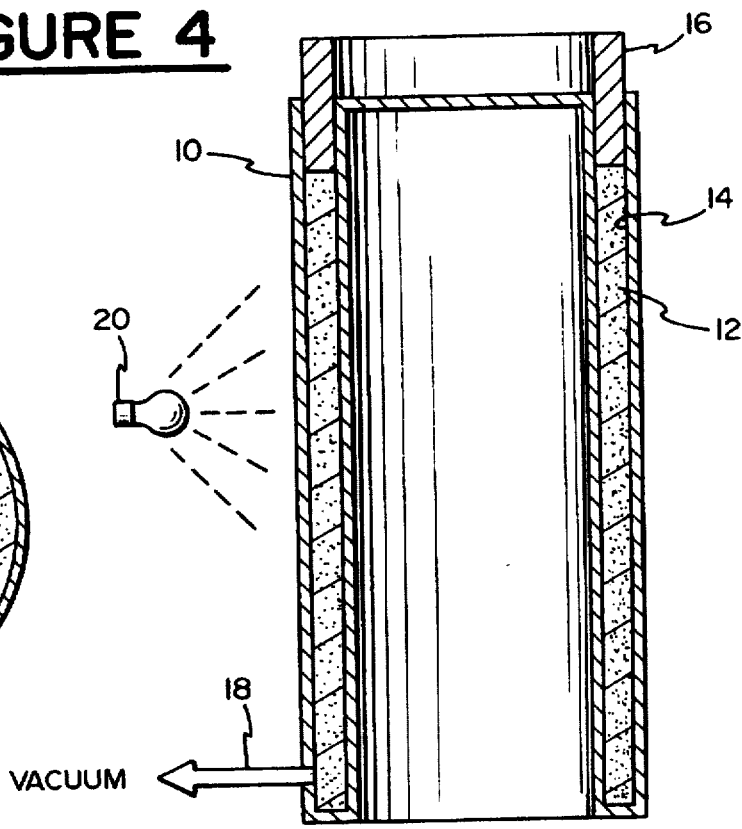

ENCAPSULATED PROPELLANT GRAIN COMPOSITION, METHOD OF PREPARATION, ARTICLE FABRICATED THEREFROM AND METHOD OF FABRICATION

FIELD OF THE INVENTION

This present invention relates to a solid propellant grain composition, and more particularly to a solid propellant grain composition which combines a metal fuel and oxidizer into a single encapsulated grain, resulting in a safe and highly stable rocket fuel. In addition, the invention relates to the method of preparing the solid propellant grain, its fabrication into an article, and the method of fabricating the article.

BACKGROUND OF THE INVENTION

Solid propellant compositions for use in rocket motors have found utility in both the military and aerospace industry. Solid fueled rocket engines do not require complicated valves, pumps and associated apparatus to convey liquid propellants. Solid propellant grains used in such engines are generally cast as a single unit comprising powdered metal fuel particles, solid oxidizers, and polymeric binder. Upon ignition, the solid fuel and the oxidizer react and release energy. Once the grain has been ignited, combustion continues until the entire grain is consumed.

One problem associated with such fuels is the highly reactive nature of the fuel and oxidizer components. In many cases the reactants are pyrophoric; that is, the mere contact of the fuel and oxidizer is sufficient to cause spontaneous combustion. This highly reactive nature requires extreme safety, both during manufacture and storage of the solid propellant fuels. The fuel and oxidizer may react as a result of temperature changes, physical impact, shock, contact with moisture, etc., any of which conditions may be encountered during manufacture and storage.

Although a number of methods for preparation of solid fuels exist, a common approach includes mixing a polymeric binder with a liquid plasticizer to form a slurry, into which the metal fuel and oxidizer are added. The resultant mixture is then poured into a mold and the mixture is cured at an elevated temperature to effect polymerization. The ingredients employed are generally limited to those which do not react with each other at either ambient or elevated temperatures. Because of these restrictions, design engineers are often required to sacrifice the optimum thrust of the fuel for the need to increase safety during manufacture.

In addition to the dangers inherent in mixing the fuel and oxidizer during manufacture, the cured polymeric matrix into which these ingredients are bound is subject to cracking. These microscopic cracks result in discontinuities between the fuel and the oxidizer within the matrix. The end result is an inefficient and irregular burn rate extending along at least a portion of the length of the solid fuel, potentially resulting in an explosion. Because combustion continues until the entire fuel unit is consumed it is also difficult to vary the thrust of the fuel throughout the burn.

Storage problems also exist with solid propellant rocket fuels. Degradation problems have been noted in particular when utilizing ammonium nitrate oxidizers. In these formulations, the ammonium nitrate decomposes over time to produce nitric acid. This build up of nitric acid has been documented to be a major cause of auto-ignition of the formulation.

Conventional solid propellant fuels are also limited by the range of chemicals which can be incorporated within the fuel. Presently, liquids such as UDMH (unsymmetrical dimethylhydrazine) cannot readily be incorporated into solid formations. The industry has attempted to utilize liquid materials, but present manufacturing procedures reduce their usefulness.

Attempts have been made to overcome the noted disadvantages in solid grain propellant fuels. U.S. Pat. No. 3,995,559 to Bice et al. discloses a solid propellant grain fuel comprising a plurality of alternating layers of solid fuel and solid oxidizer. The fuel and the oxidizer particles are separately encapsulated within the matrix. U.S. Pat. No. 3,677,010 to Fink et al. discloses a solid fueled rocket motor comprising layers of metal fuel and oxidant bound within a matrix. The matrix sheets are arranged in a concentric format to vary the burn rate of the engine. U.S. Pat. No. 3,954,076 to Mangum discloses the encapsulation of submicron particles of a preferred oxidizer which is then incorporated within a polymer. U.S. Pat. No. 4,861,627 to Mathiowitz et al. discloses a multi-wall polymeric microcapsule whereby two separate substances are incorporated within the polymeric microwalls for controlled delivery of the substances.

None of the above-mentioned prior art discloses either a method nor a product for maintaining the otherwise unstable oxidizer and fuel components separate by incorporating them within a single encapsulated grain for distribution within a matrix binder.

SUMMARY OF THE INVENTION

The present invention relates to a solid propellant grain composition wherein the individual propellant grain compositions are comprised of a first reactant component, typically an oxidizer. A first barrier coating encapsulates the first reactant component and separates it from a second reactant component, typically a metal fuel which is applied to the coated oxidizer. A second barrier coating encapsulates the entire propellant grain to yield a multi-walled particle containing both oxidizer and fuel.

A method for preparing a solid propellant grain composition according to the invention includes providing a first reactant component, such as an oxidizer. The first reactant component is then coated with a first encapsulating barrier material. A cooperating second reactant component, such as a metal fuel, is applied over the coated first reactant component. A second encapsulating barrier material is then applied over the metal fuel reactant component to yield a solid propellant grain composition incorporating both the metal fuel and the oxidizer into a single grain composition.

A shaped propellant composite for use within a solid fueled rocket engine according to the invention comprises a plurality of solid propellant grains. Each of the grains includes a first reactant component, a first barrier coating encapsulating the first reactant component, a cooperating second reactant component surrounding the first barrier coating, and a second barrier coating encapsulating the second reactant component. These solid propellant grains are intermixed with a polymeric binder to yield a shaped propellant composite.

A method for preparing a shaped propellant composite for use within a solid fueled rocket engine according to the invention includes filling a mold with a plurality of solid propellant grains, each of the grains including an oxidizer and metal fuel separately encapsulated. A curable binder component is added to the mold. A vacuum is then applied to the mold for compressing the binder and solid propellant grain mixture. The binder and propellant mixture are cured by heat, catalyst or radiation to yield a shaped propellant composite.

These and other objects and advantages of the invention will be readily apparent in view of the following detailed description of the drawings of the above described invention.

BRIEF DESCRIPTION OF THE DRAWINGS

The above and other objects and advantages are novel features of the present invention will become apparent from the following detailed description of the preferred embodiment of the invention illustrated in the accompanying drawings, wherein:

FIG. 1 is a cross-sectional view of a solid propellant grains according to the present invention.

FIG. 2 is an elevational view, partially in section, of a solid rocket motor incorporating the grains of the present invention.

FIG. 3 is a cross-sectional view taken along lines 3—3 of FIG. 2.

FIG. 4 is schematic diagram illustrating the method for preparing a shaped propellant composite according to the invention.

DETAILED DESCRIPTION OF THE INVENTION

The present invention incorporates particulate solid ingredients which react to release energy. A wide variety of reactant components exist, including various high-energy fuel-oxidizer combinations known in the art. High-energy fuels are generally powdered metal and metal hydrides exemplified by aluminum hydride, magnesium, magnesium hydride, lithium, lithium hydride, boron, boron hydride, as well as alloys thereof. As an oxidizer, inorganic nitrates, chlorates, perchlorates and the like, such as ammonium perchlorate, ammonium nitrate, alkali and alkaline earth metal chlorates, perchlorates and nitrates will normally be employed. Typical of such oxidizers are sodium nitrate, ammonium nitrate, potassium nitrate, potassium perchlorate, lithium perchlorate, nitronium perchlorate and nitramines such as bis-2,2,2-trinitroethylnitramine.

In addition to the above fuel-oxidizer reactant systems, other explosives and fuels are incorporated within the scope of this present invention. For example, liquid oxidizers, such as UDMH (unsymmetrical dimethylhydrazine) have been unavailable for use in solid rocket propellants. With the present invention, the liquid UDMH oxidizer can be encapsulated within a single grain containing the co-reactant reducer fuel. Additional explosives within the scope of the present invention include phloroglucinol, carbohydrazide, cubanes, nitrocellulose, nitroguanidine, cyclonite, 2,4,6-trinitrotolune and others known in the art.

The solid propellant grain according to the present invention is best shown in FIG. 1 and generally indicated by A. A first reactant component 2 is shown as the central core material. This inner core would normally include the oxidizer component. The first reactant component 2 comprises roughly 70% of the total grain composition. The oxidizer is in spheroidal prill form, and has a size between about 800 to 1200 microns. Prilled explosive compositions are known in the art, as exemplified by U.S. Pat. No. 4,100,000, and any such methods of production are contemplated within the scope of the present invention. In addition, liquid reactants such as UDMH may be microencapsulated in solution and the dried microspheres then used as the first reactant component 2 of the propellant grain composition A. Microencapsulation of explosives and liquid propellants can be effected as described in U.S. Pat. Nos. 2,299,694; 2,712,507; 3,016,308; 3,429,827 and 3,720,534. Other fluid reactants, such as gases, are contemplated within the scope of this invention.

The first reactant component 2 is encapsulated by a first barrier coating 4, such as can be accomplished with a Wooster fluid bed encapsulator. A broad class of polymers is available for this encapsulation. Among such polymers are the thermosetting plastics, such as polyurethanes, polyamides, polyurea, polyesters and epoxides. In addition, thermoplastic resins are included within the scope of the present invention, and include polystyrene and polyvinylchloride. Radiation curable polymers are particularly suited to the present invention as very fast cure times for the thin films can be obtained by the application of electron beam or ultraviolet radiation. These radiation curable resins include the epoxides and the polyurethanes.

Prior to coating the first reactant component 2, the prilled oxidizer may first be coated with a surface active agent to promote uniform coating by the first barrier coating. The first reactant component 2 is then coated using conventional encapsulation to effect a 1 micron to 8 micron polymer layer, which serves as the first barrier coating 4. Several methods are available in the art for encapsulation in emulsion and include U.S. Pat. Nos. 3,977,922; 2,800,458; 2,969,331; 4,814,274; 4,861,627 as well as the noted fluidized bed technology.

A reducer fuel is then selected and applied to layer 4 as a second reactant component 6. If the reducer fuel is a powdered metal, then the first barrier coating 4 is initially treated with 0.5% to 1.0% organic tacking agent. Other reaction modifiers, binding agents, etc. may be added to this layer prior to deposition of the reducer fuel.

Powdered metal, approximately 1 micron in size, is applied to the first barrier coating 4 by vacuum deposition or similar methods of application. This second reactant component 6 makes up approximately 14% of the total grain composition. Although inorganic reducer fuels are preferred, organic reducer fuels may be applied as either fine ground powders or as organic melts.

A second barrier coating 8 is then applied over the second reactant component 6, thereby encapsulating the entire propellant grain structure. This second barrier coating 8 is similar in composition and application as the above-noted first barrier coating 4. Thus, a multi-tier spherical assembly is built from a series of concentric layers of alternating reactant components and barrier coating layers.

As can be appreciated, the relative proportions of the first reactant component 2 to the second reactant component 6 can be varied to manipulate the burn rate of the system into which the propellant grain composition is incorporated. One of the reactant components may contain between 70% to 97% of the grain composition, while the other reactant component may contain between 3% to about 14% of the grain composition with the balance consisting of the barrier coatings. The barrier coatings may vary in thickness, depending on the volatility of the reactant components. Generally, the thickness of the barrier coating is between 2 microns to about 10 microns. The reactant components may have a particle size between 300 microns and about 2,000 microns for the first reactant component, while the second reactant component may have a thickness between 50 microns to about 70 microns. Additional reactant component layers (not shown) may be added to the solid propellant grain composition if so required.

The outermost barrier 8 can be modified with conventional binding agents or the like to enhance grafting of the individual propellant grains to a matrix polymeric binder. Catalysts, reaction-modifiers, and ballistic modifiers may also be added to the barrier coating layers 4 and 8 as desired to tailor the reaction parameters of the reactants.

Additionally, trace metals can be incorporated into the outermost barrier layer 8. Various trace metals with signature x-ray defraction patterns can be used to define and identify the matrix distribution of propellant grain fuels having different reaction parameters. This labeling of individual propellant grains allows propellant grains having different dimensions, chemical compositions or burn rates to be coded for identification in the resulting composite.

Turning now to FIG. 2, the method of preparing the solid propellant grain composition within a binder matrix is disclosed through use of a mold or like container 10. In the case of solid fuel propellants for incorporation into rocket engines, the shape of container 10 is usually cylindrical. However, other shapes can be used dependent upon design requirements. The individual propellant grains are intermixed with a polymeric binder to yield a slurry 12, which is poured into the mold cavity 14. The binder matrix into which the propellant grain is introduced is selected from a wide range of polymers, including thermosetting, thermoplastic, and radiation curable resins. Because the oxidizer and fuel are incorporated into a single encapsulated grain, heat curable resins may be used for the binder matrix. The heat sensitivity of the reactants is greatly reduced when incorporated within the grain structure according to the present invention. Additionally, radiation curable resins can be selected for use within the present invention. Such resins are characterized by using ultraviolet light or electron beam radiation to effectuate the cure.

After the propellant grain/binder slurry is added to the mold cavity 14, the mold is closed by an appropriate top 16. A vent 18 associated with the interior of the cavity is opened and a vacuum applied to release gases and excess fluid during cure. The propellant resin slurry 12 is then cured by an appropriate UV light or electron beam source 20. If the resin matrix is thermosetting, then an appropriate heat source (not shown) is applied to the mold cavity 14. After cure, the fuel article is removed from the mold for use within a solid fuel rocket engine.

FIG. 3 illustrates a shaped solid propellant article incorporated within a solid fuel rocket engine 22. The fuel for the rocket engine 22 is comprised of a series of concentric layers 24, 26, 28 of propellant grain dispersed within a cured binder matrix and surrounding a burn tunnel 29 feeding nozzle 31. Thus, specific burn profiles within the solid fuel can be attained by varying the metal fuel to oxidizer ratio in each of the layers 24 through 28. For example, the burn rate of propellant grain layer 28 could be higher than layer 26 or layer 24. In this way the thrust of the rocket can be preset according to a desired burn rate. Also, the thickness of the layers 24, 26 and 28 may be varied for control over burn times of individual layers. FIG. 4 is an end view of the rocket engine 22 taken along lines 4—4 and showing the concentric layers 24 through 28.

The following examples are given for the purpose of illustration of this invention and are not intended as limitations thereof.

EXAMPLE 1

Explosive grade ammonium nitrate was obtained in prill form (Spectrum Chemical Inc.) and ranged in size from 800 to 1500 microns. This prill was reduced in size by immersion in water to remove the protective organic layer, and reduced the prill size to between 300 to 1200 microns. The water wet prill was dried in an oven overnight at 100° C. An aluminum powder was obtained for a reducer fuel (Spectrum Chemical Inc.), and had a particle size ranging between 50 to 75 microns.

Coating and layering were performed in a heated rotating drum. The coats were performed on 100 gram batches, and the drum used was a 4" diameter by 6" length device having an internal surface containing mixing fingers 1" long by 0.1" in diameter.

The drum was charged with 100 grams ammonium nitrate, 2.635 grams of AP-600 (Wil-Cor Inc., Pasadena, Tex.), an isopthalic anhydride resin, and 0.465 grams methyl ethyl ketone curing agent. The resin was pre-mixed with 1 ml. styrene monomer to reduce the viscosity of the resin. The drum was rotated at 4 rpm for ten minutes until all of the resin was distributed over the ammonium nitrate prill. The drum was then heated to 60° C. to accelerate cure. Minimum air flow was maintained through the drum to remove vapors and decrease cure times. After heating for fifteen minutes, the coated prill remained tacky.

The drum was then charged with 22 grams of aluminum powder, and rotation of the drum was restarted without heating or air flow until all of the aluminum powder was adsorbed onto the encapsulated ammonium nitrate prill. Uniform coats were obtained in 4-5 minutes. The drum was stopped, and the final resin barrier coating was added by placing 2.635 grams AP-600 pre-mixed with 1 ml. of styrene monomer and 0.465 grams methyl ethyl ketone to form the outermost layer. After twenty minutes, minimum air flow was again begun and heat applied for thirty minutes. At this point the resin had cured with no surface tacking observed. The free flowing propellant grains were transferred to a tray and placed in a 60° C. oven overnight to complete the cure.

During coating, 20% of the isopthalic anhydride resin was lost to the interior of the drum surface. Additional resin was added to the drum during coating to obtain uniform surface coats between 1-8 micron. The range of thickness was generally determined from the range of particle size of the central core of ammonium nitrate reactant. Any loss of aluminum powder reducer fuel to the internal drum surface was found to be minimal.

EXAMPLE 2

Following the procedure outlined in Example 1, a polyester resin AP-700 (Wil-Cor, Inc., Pasadena, Tex.) was used for encapsulating the fuel and oxidizer. The same ratios of ammonium nitrate, aluminum, resin and MEKP, as well as styrene were used. The cure time for the polyester resin varied from Example 1, however similar solid grain propellants were obtained.

While this invention has been described as having a preferred design, it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention and the limits of the appended claims.

What we claim:

1. A stable solid propellant composition containing all primary reactants within a single, castable grain structure comprising:

a. a fuel oxidizer reactant component selected from the group consisting of inorganic chlorates, perchlorates, nitrates and organic oxidizers;

b. a reducer fuel reactant component selected from the group consisting of aluminum, magnesium, lithium, boron and hydrides thereof;

c. one of said reacting components encapsulated by a first barrier coating and forming a central core;

d. the other of said reactant components surrounding said first barrier coating and said central core;

e. a second barrier coating encapsulating and in contact with the other of said reactant components; and f. said fuel oxidizer reactant component comprising from about 70 to about 97 percent by weight of said grain composition, said reducer fuel reactant component comprising from about 3 to about 14 percent by weight of said grain composition and the balance of said grain composition is comprised of said first and said second barrier coatings.

2. A solid propellant grain composition as in claim 1, wherein:

a) one of said reactant components is a fluid.

3. A solid propellant grain composition as in claim 2, wherein:

a) said fluid is a liquid.

4. A solid propellant grain composition as in claim 1, wherein:

a) each of said reactant components are solids.

5. A solid propellant grain composition as in claim 1, wherein:

a) said first barrier coating is of the same material as said second barrier coating.

6. A solid propellant grain composition as in claim 1 and further comprising:

a) a tacking agent coating said first barrier coating for promoting adhesion of said other of said reactant component.

7. A solid propellant grain composition as in claim 6, and wherein:

a) said tacking agent comprises from between about 0.5% to about 1.0% of said grain composition.

8. A solid propellant grain composition as in claim 5, wherein:

a) each of said barrier coatings is comprised of a combustible, moisture and vaporproof non-reactant material.

9. A solid propellant grain composition as in claim 8, wherein:

a) said barrier coatings are selected from the group consisting of thermoset, thermoplastic and radiation curable resins.

10. A solid propellant grain composition as in claim 8, wherein:

a) each of said barrier coatings has a thickness of from between about 2 microns to about 10 microns.

11. A solid propellant grain composition as in claim 1, wherein:

a) one of said and said reactant components has a particle size of between about 300 microns to about 2000 microns.

12. A solid propellant grain composition as in claim 11, wherein:

a) one of said second reactant components has a particle size of between about 50 microns to about 70 microns.

13. A solid propellant grain composition as in claim 1 and further comprising:

a) a surface active agent coating on said one of said reactant components for promoting uniform thickness of said first barrier coating.

14. A solid propellant grain composition as in claim 1 and further comprising:

a) a surface modifying agent applied to said second barrier coating for promoting bonding of said propellant grain to a matrix binder.

15. A solid propellant grain composition as in claim 14 and wherein:

a) said matrix binder is selected from the group consisting of thermosetting, thermoplastic and radiation curable resins.

16. A solid propellant grain composition as in claim 1, wherein:

a) said fuel oxidizer is selected from the group consisting of potassium nitrate, sodium nitrate, ammonium nitrate, ammonium perchlorate, potassium perchlorate, lithium perchlorate, nitronium perchlorate, unsymmetrical dimethyl hydrazide, phloroglucinol, carbohydrazide, cubanes, nitrocellulose, nitroguanidine, cyclonite and 2,4,6-trinitrotolulene.

* * * * *